United States Patent [19]

Taubenmann

[11] Patent Number: 4,774,846

[45] Date of Patent: Oct. 4, 1988

[54] TEST APPARATUS FOR MIXING APPARATUSES FOR MULTICOMPONENT PLASTICS, IN PARTICULAR POLYURETHANE

[75] Inventor: Peter Taubenmann, Munich, Fed. Rep. of Germany

[73] Assignee: Elastogran Maschinenbau GmbH, Strasslach, Fed. Rep. of Germany

[21] Appl. No.: 5,951

[22] Filed: Jan. 22, 1987

[30] Foreign Application Priority Data

Jan. 23, 1986 [DE] Fed. Rep. of Germany ....... 3601869

[51] Int. Cl.$^4$ .............................................. G01N 1/20
[52] U.S. Cl. .................................. 73/863.43; 73/864; 137/625.18
[58] Field of Search ................ 73/863.71, 863.72, 863, 73/864, 863.41, 863.43; 422/103; 137/625.18

[56] References Cited

U.S. PATENT DOCUMENTS

| | | | |
|---|---|---|---|
| 1,819,663 | 8/1931 | Walker | 137/625.18 X |
| 2,692,502 | 10/1954 | Warren | 73/863.71 |
| 2,841,170 | 7/1958 | Kalsey | 137/625.18 X |
| 3,381,536 | 5/1968 | Horetl et al. | 73/863.71 X |

FOREIGN PATENT DOCUMENTS 2940442 4/1981 Fed. Rep. of Germany .

Primary Examiner—Tom Noland
Attorney, Agent, or Firm—Keil & Weinkauf

[57] ABSTRACT

The test apparatus is equipped with two valves, of which the valve arranged in the test line 3 which branches off from the return line 1 is a seat valve 7 whose outlet aperture 13 forms the end of the test line, so that the amount of component emerging through the outlet aperture passes directly into the test beaker 6. The other valve, which is preferably a sliding valve 9, is designed and arranged so that one valve opens only when the other valve is closed, so that undefined flow through both lines 1 and 3 is avoided. The test apparatus permits error-free determination of the test amount per unit time. No residues remain in the apparatus, and the individual parameters which are important for the test result can be determined exactly and simply.

8 Claims, 1 Drawing Sheet

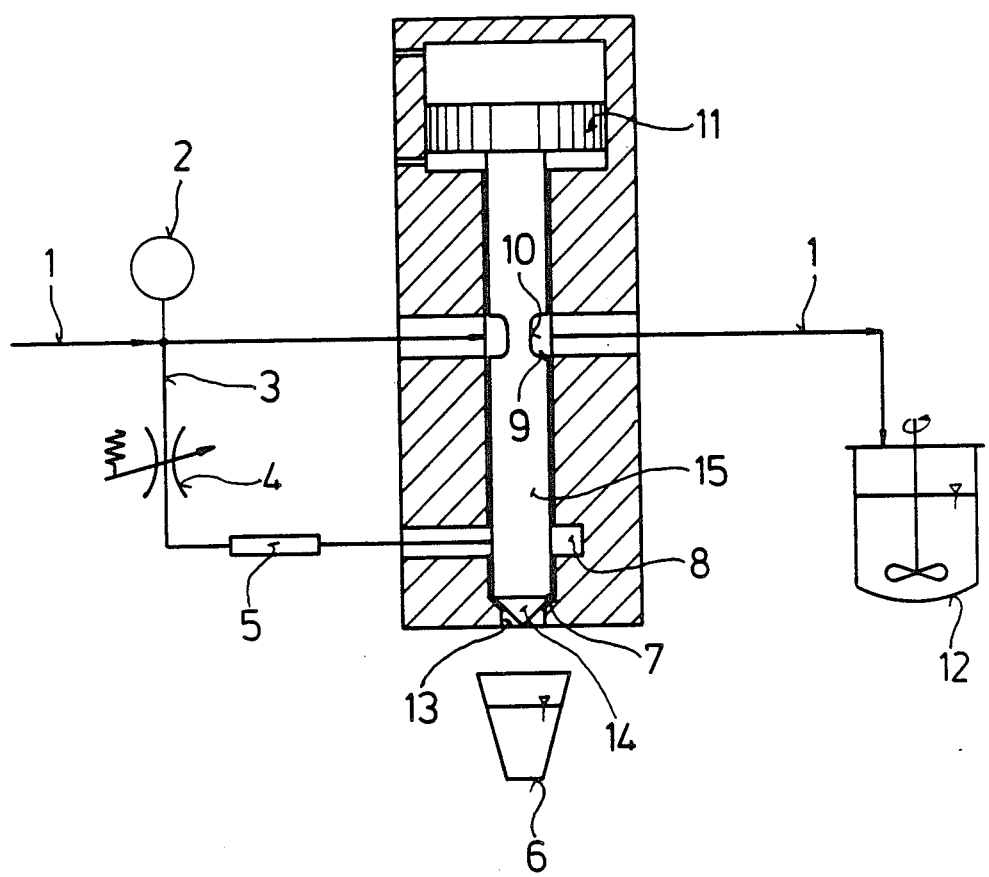

TEST APPARATUS FOR MIXING APPARATUSES FOR MULTICOMPONENT PLASTICS, IN PARTICULAR POLYURETHANE

BACKGROUND OF THE INVENTION AND PRIOR ART

The present invention relates to a test apparatus for a mixing apparatus for multi-component plastics, in particular polyurethane, having a first valve in a component return line and a second valve in a test line which branches off the return line upstream of the first valve, the two valves being operated jointly and in the opposite sense with respect to one another.

In a known test apparatus of the above type, the two valves are each formed by a ball valve. The ball valves can be actuated jointly by means of a pneumatic actuator. An outlet pipe for smoothing the flow of the component to be tested before the latter flows into a test beaker or the like is located downstream of the ball valve in the test line. The flow-smoothing outlet pipe is necessary because the ball valve releases only a very small cross-section at the beginning of its opening movement, with the result that very agitated, ie. squirting, flow is produced. Out of the test amount bled off, a larger or smaller unknown residual amount remains in the outlet pipe, falsifying the final test result. This applies in particular to the isocyanate component, which crystallizes out in the outlet pipe, ie. is deposited there, so that this pipe may even have to be replaced. The two ball valves forming the valves are connected so that negative overlap is present, ie. during opening and closing there is a transition range in which both paths are open. The component to be tested is divided up in an undefined manner, which may likewise lead to errors in testing. In particular, the ball valve constituting the first valve in the test line is impeded in its movement by component material which has crystallized out and has been deposited on the outer surface of the ball as well as in the outlet pipe. The result is that movement is impeded, at least during the initial actuation after a fairly long shutdown time, so that the intended test time cannot be maintained. This in turn leads to an error since the test amount per unit time must be established. In the case of pronounced crystallization, this ball valve may no longer open at all. Furthermore, the crystals result in greater wear.

OBJECTS AND SUMMARY OF THE INVENTION

It is an object of the present invention to provide a test apparatus of the type stated at the outset which operates more precisely and in a more fail-safe manner.

We have found that this object is achieved in accordance with the defining clause of claim 1 if the first valve is a sliding valve and the second valve is a seat valve whose outlet aperture forms the end of the test line.

Because the second valve is a seat valve which opens the outlet aperture very rapidly, when correct actuation is employed the component stream leaves the outlet aperture of the seat valve so smoothly that there is no need for an outlet pipe to effect smoothing. The test component emerges from the outlet aperture and passes directly into the test beaker. The valves are connected so that the component flows either in the return line or in the test line but not simultaneously in both lines in an undefined manner. Crystallization, in particular of isocyanate, does not cause any damage in a seat valve since the movement of the valve is not significantly impeded by any crystals deposited. Since there is no outlet pipe, it is not possible for any test quantity to remain behind and not be detected. Apart from the fact that crystallization does not impair its functioning, a seat valve is also absolutely tight. The large outlet crosssection leads to a spray-free outflow.

Advantageously, the test apparatus may be of the form stated in claim 2 wherein the valve body forms a common actuating piston for the two valves.

The embodiment according to claim 3, wherein the test line ends in the seat valve in an annular space formed in the valve housing upstream of the seat, helps to achieve trouble-free operation and a smooth outflow.

When the apparatus is of the form described in claim 5 according to which an adjustable restrictor is arranged in the test line downstream of the branch-off point of the test line from the return line and upstream of the seat valve, the restrictor can be set so that there is no pressure change in the return line during testing. In the case of different discharge rates, the piloted valve adjusts so that resetting manually, for example after reading a manometer, is not absolutely essential.

The embodiment as described in claim 8 according to which a flow-smoothing projection is formed at the end face of the valve body of the seat valve which is opposite the outlet aperture, ensures further smoothing of the flow in the region of the outlet aperture of the seat valve.

BRIEF DESCRIPTION OF THE DRAWING

The invention is described below with reference to the drawing in which the test apparatus is schematically shown for one component.

The only FIGURE shows the test apparatus schematically for one component. Only the essential parts of the test apparatus in the return line are shown, the latter being denoted by 1.

DETAILED DESCRIPTION OF THE PREFERRED EMBODIMENT

The return line 1 leads to a stock container 12 for the relevant component.

A test line 3 and a line to a manometer 2 branch off from the return line 1. A piloted restrictor 4 and, following this, a smoothing zone 5 are arranged downstream of the branch in the test line 3. The test line ends in a seat valve 7, whose outlet aperture is denoted by 13. The body of the seat valve is formed by a piston 15. Upstream of the seat valve 7, an annular space 8 is provided in the housing, the test line 3 entering the said annular space.

A sliding valve 9 is present in test line 1. The two valves, ie. the seat valve 7 and the sliding valve 9, have a common valve body, ie. the piston 15, which is moved by means of a hydraulic piston and cylinder unit 11. Instead of hydraulic actuation, it is also possible to provide another type of actuation, for example a pneumatic one. The sliding valve has a constriction 10 in the piston 15.

A projection 14 is provided on the end face of the piston 15 which forms the upper limit of the outlet aperture 13, the said projection being shaped so as to provide advantageous flow characteristics, ie. smoothing the component stream emerging from the outlet aperture 13.

The geometry of the two valves 7 and 9 is chosen to ensure that one valve opens only when the other valve is closed, so that flow does not occur simultaneously through both lines 1 and 3.

The piloted restrictor 4 in conjunction with the manometer 2 makes it possible to maintain flow under constant pressure. Before a test is carried out, the apparatus assumes the position shown in the drawing, ie. the sliding valve 9 is open and the component flows unimpeded via the return line 1 to the stock container 12. To carry out a test, the piston and cylinder unit 11 is actuated under time control and, when the sliding valve 9 is closed, the seat valve 7 opens. The restrictor 4 prevents pressure fluctuations, and the smoothing zone 5 ensures smooth entry into the annular space 8. From there, the amount of component to be tested flows along the projection, through the outlet aperture 13 and into the test beaker 6. When the appropriate signal is given to end the test time, the seat valve 7 is first closed and the sliding valve 9 then opened.

Crystals which may form in the region of the seat valve when the latter is in the closed position cannot impede the movement of this seat valve in the opening direction. There is virtually no crystallation during a very short test procedure, so that the closing movement too is not impeded. The flow through the outlet aperture 13 is smooth and without spray, and not residues remain in this region. The total test amount is introduced into the test beaker 6 and the test procedure takes place over the predetermined period, so that the amount per unit time can be determined exactly.

The entire test apparatus with its essential components can be designed in the form of a compact unit which occupies little space in the mixing apparatus and can readily be integrated therein.

I claim:

1. A test apparatus for a mixing apparatus for multi-component plastics having a first valve in a component return line and a second valve in a test line which branches off the return line upstream of the first valve, the two valves being operated jointly and in the opposite sense with respect to one another, wherein the first valve is a sliding valve and the second valve is a seat valve whose outlet aperture forms the end of the test line, the valve body of said sliding valve serving as the stem of said seat valve.

2. Test apparatus as claimed in claim 1, wherein said valve body of the sliding valve forms a common actuating piston for the two valves.

3. Test apparatus as claimed in claim 1, wherein the test line ends in the seat valve, in an annular space which is formed in the valve housing upstream of the seat.

4. Test apparatus as claimed in claim 1, wherein an adjustable restrictor is arranged in the test line, downstream of the branch-off point of the test line from the return line and upstream of the seat valve.

5. Test apparatus as claimed in claim 4, wherein an adjustable restrictor is arranged in the test line, upstream of the seat valve, and the restrictor is piloted.

6. Test apparatus as claimed in claim 1, wherein a smoothing zone is provided upstream of the seat valve.

7. Test apparatus as claimed in claim 1, wherein a flow-smoothing projection is formed at that end face of the valve body of the seat valve which is opposite the output aperture.

8. A test apparatus for a mixing apparatus for multi-component plastics having a first valve in a component return line and a second valve in a test line which branches off the return line upstream of the first valve, the two valves being operated jointly and in the opposite sense with respect to one another, wherein the first valve is a sliding valve and the second valve is a seat valve whose outlet aperture forms the end of the test line, the valve body of said sliding valve serving as the steam of said seat valve, and forming a common actuating piston for the two valves, said common piston having a restriction forming part of said sliding valve.

* * * * *